(12) United States Patent
Xu et al.

(10) Patent No.: US 11,380,213 B2
(45) Date of Patent: Jul. 5, 2022

(54) CUSTOMER CARE TRAINING WITH SITUATIONAL FEEDBACK GENERATION

(71) Applicant: International Business Machines Corporation, Armonk, NY (US)

(72) Inventors: Anbang Xu, San Jose, CA (US); Vibha S. Sinha, Santa Clara, CA (US); Rama Kalyani T. Akkiraju, Cupertino, CA (US); Jalal U. Mahmud, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 15/897,487

(22) Filed: Feb. 15, 2018

(65) Prior Publication Data
US 2019/0251859 A1 Aug. 15, 2019

(51) Int. Cl.
| | |
|---|---|
| G09B 19/00 | (2006.01) |
| G06Q 30/00 | (2012.01) |
| G09B 19/04 | (2006.01) |
| G09B 7/06 | (2006.01) |
| G09B 5/02 | (2006.01) |
| G09B 5/04 | (2006.01) |
| H04L 51/02 | (2022.01) |
| G09B 7/02 | (2006.01) |

(Continued)

(52) U.S. Cl.
CPC .............. *G09B 19/00* (2013.01); *G06F 40/42* (2020.01); *G06Q 30/016* (2013.01); *G09B 5/02* (2013.01); *G09B 5/04* (2013.01); *G09B 7/02* (2013.01); *G09B 7/06* (2013.01); *G09B 19/04* (2013.01); *H04L 51/02* (2013.01); *G06F 40/35* (2020.01)

(58) Field of Classification Search
CPC .................. G06Q 30/016; G06Q 10/06398; G10L 15/22; H04L 51/02; H04M 3/5175; G06F 40/35
See application file for complete search history.

(56) References Cited

U.S. PATENT DOCUMENTS

| | | | |
|---|---|---|---|
| 8,094,790 B2 | 1/2012 | Conway et al. | |
| 8,775,332 B1 * | 7/2014 | Morris ..................... | G06N 5/02 706/11 |

(Continued)

FOREIGN PATENT DOCUMENTS

WO 2007106113 A2 9/2007

OTHER PUBLICATIONS

Sureshchandar, et al. "The relationship between service quality and customer satisfaction—a factor specific approach." Journal of Services Marketing, vol. 16, Issue 4, pp. 363-379 <http://docshare01.docshare.tips/files/28924/289245649.pdf>.

(Continued)

*Primary Examiner* — Jack Yip
(74) *Attorney, Agent, or Firm* — Jared L. Montanaro (57) ABSTRACT

In an approach for training customer service agents using persona-based chatbots, a processor retrieves customer service interaction information. A processor analyzes, using natural language processing, the customer service interaction information, wherein the analyzing includes preprocessing and aggregating the customer service interaction information. A processor interacts with a user. A processor provides feedback to the user, based on the user's style and performance during training.

14 Claims, 3 Drawing Sheets

(51) Int. Cl.
  *G06F 40/42* (2020.01)
  *G06F 40/35* (2020.01)

(56) References Cited

U.S. PATENT DOCUMENTS

| | | | | |
|---|---|---|---|---|
| 8,798,522 | B2* | 8/2014 | Nguyen | G09B 7/00 |
| | | | | 434/362 |
| 10,417,643 | B2* | 9/2019 | Sri | G06Q 30/016 |
| 10,467,792 | B1* | 11/2019 | Roche | G06F 40/20 |
| 2004/0014017 | A1* | 1/2004 | Lo | G09B 7/00 |
| | | | | 434/322 |
| 2004/0018477 | A1* | 1/2004 | Olsen | G09B 7/04 |
| | | | | 434/307 R |
| 2008/0183678 | A1* | 7/2008 | Weston | G06F 16/335 |
| 2008/0254419 | A1* | 10/2008 | Cohen | G09B 5/06 |
| | | | | 434/219 |
| 2008/0301557 | A1* | 12/2008 | Kotlyar | G06Q 10/10 |
| | | | | 715/706 |
| 2010/0062403 | A1 | 3/2010 | Williams et al. | |
| 2011/0066938 | A1* | 3/2011 | Nageswaram | G06Q 10/107 |
| | | | | 715/706 |
| 2011/0212428 | A1* | 9/2011 | Baker | G09B 5/00 |
| | | | | 434/308 |
| 2014/0113263 | A1* | 4/2014 | Jarrell | G09B 23/28 |
| | | | | 434/262 |
| 2014/0254790 | A1* | 9/2014 | Shaffer | H04M 3/5233 |
| | | | | 379/265.11 |
| 2015/0012467 | A1* | 1/2015 | Greystoke | G06N 20/00 |
| | | | | 706/12 |
| 2015/0254675 | A1* | 9/2015 | Kannan | G06Q 30/02 |
| | | | | 705/304 |
| 2015/0310758 | A1 | 10/2015 | Daddona et al. | |
| 2016/0019411 | A1* | 1/2016 | Bart | G06V 40/20 |
| | | | | 382/118 |
| 2016/0189558 | A1* | 6/2016 | McGann | G06Q 30/016 |
| | | | | 434/219 |
| 2017/0316515 | A1* | 11/2017 | Varma | H04L 67/125 |
| 2018/0137432 | A1* | 5/2018 | Chen | G10L 25/63 |
| 2018/0268341 | A1* | 9/2018 | Rini | G06Q 10/06398 |
| 2018/0341903 | A1* | 11/2018 | Keen | G06Q 10/063118 |
| 2019/0058793 | A1* | 2/2019 | Konig | H04M 3/5175 |
| 2019/0103099 | A1* | 4/2019 | Panainte | G06F 3/167 |
| 2019/0163741 | A1* | 5/2019 | Buckwalter | G06N 5/02 |

OTHER PUBLICATIONS

Rose et al., "Satisfaction and Dimensions of Control Amongst Call Centre Customer Service Representatives", (2005), The International Journal of Human Resource Management, 16(1), 42 pages.
Sundararaman, et al.; "Customer Halo"; Jan. 3, 2017, © 2017 Cognizant US Corp LLC, IP.com No. IPCOM000248733D, 12 pages, <http://ip.com/IPCOM/000248733D>.
Anonymous; "Delivering Appropriate Advice and Product Solutions that Meet Customer Needs"; Oct. 15, 2007, IP.com No. IPCOM000159260D, 12 pages, <http://ip.com/IPCOM/000159260D>.
"Meeting Training Needs through Operator Training Simulators"; May 7, 2012, IP.com No. IPCOM000217309D, 18 pages, <http://ip.com/IPCOM/000217309D>.
Agbor, Jenet Manyl; "The Relationship between Customer Satisfaction and Service Quality: a Study of Three Service Sectors in Umea"; Umea School of Business Masters Thesis; 2011, 92 pages.
Bertuzzi, Trish, "Why are 50% of Sales Reps Missing Quota?!", Inside Sales Experts Blog, The Bridge Group, Inc., Aug. 18, 2010, 3 pages, <https://blog.bridgegroupinc.com/Blog/tabid/47760/bid/13823/Why-are-50-of-Sales-Reps-Missing-Quota.aspx>.
Xu et al., "A New Chatbot for Customer Service on Social Media", CHI Conference on Human Factors in Computing Systems, Denver, Colorado, May 6-11, 2017 pp. 3506-3510.
Wysocki et al., "Customer Complaints and Types of Customers", University of Florida Cooperative Extension Service, Institute of Food and Agriculture Sciences, EDIS, May 2001, <http://edis.ifas.ufl.edu.>.
Sureshchandar, et al. "The relationship between service quality and customer satisfaction—a factor specific approach." Journal of Services Marketing, vol. 16, Issue 4, 2002, pp. 363-379 <http://docshare01.docshare.tips/files/28924/289245649.pdf>.
Grebner, et al. "Working conditions, well-being, and job-related attitudes among call centre agents." European Journal of Work and Organizational Psychology 12, No. 4 (2003): 341-365. <https://interruptions.net/literature/Grebner-EJWOP03.pdf>.

* cited by examiner

CUSTOMER CARE TRAINING WITH SITUATIONAL FEEDBACK GENERATION

BACKGROUND

The present invention relates generally to the field of customer service, and more particularly to training customer service agents using persona-based chatbots.

Customer service is the provision of service to customers before, during, and after a purchase. The perception of success of such interactions is dependent on employees who can adjust themselves to the personality of the customer. Customer service concerns the priority an organization assigns to customer service relative to components, such as, product innovation and pricing. As such, an organization that values good customer service may spend more money in training employees than the average organization or may proactively interview customers for feedback.

A chatbot is a computer program which conducts a conversation via auditory or textual methods. Such programs are often designed to convincingly simulate how a human would behave as a conversational partner. Chatbots are typically used in dialog systems for various practical purposes, including customer service or information acquisition. Some chatbots use sophisticated natural language processing systems, but many simpler systems scan for keywords within the input and pull a reply with the most matching keywords or the most similar wording pattern from a database.

SUMMARY

Aspects of an embodiment of the present invention disclose a method, computer program product, and computing system for training customer service agents using persona-based chatbots. A processor retrieves customer service interaction information. A processor analyzes, using natural language processing, the customer service interaction information, wherein the analyzing includes preprocessing and aggregating the customer service interaction information. A processor interacts with a user. A processor provides feedback to the user, based on the user's style and performance during training.

DETAILED DESCRIPTION

Embodiments of the present invention recognize that customer service is the bridge between an organization and its current and potential customers. If the organization wants to improve the quality of its customer service, the efforts must begin with the training of the organization's customer service agents. Embodiments of the present invention recognize that many organizations have spent tremendous resources to provide extensive training to their customer service agents, pertaining to products, services, and guidelines for dealing with customers; however, more than half of the customer service agents are under performing and not executing duties with full efficiency.

Embodiments of the present invention disclose a feature that can simulate customers' behavior and offer situational feedback during the training process, wherein customer requests can be generated by the training system, and the conversational flow between a simulated customer and a customer service agent is not predefined. Embodiments of the present invention provide a comprehensive simulation environment with a high degree of realism, as well as help customer service agents acquire first-hand experiences to address unexpected emergencies.

Embodiments of the present invention disclose an approach to train customer service agents using persona-based chatbots.

Embodiments of the present invention will now be described in detail with reference to the Figures.

Figure 1:
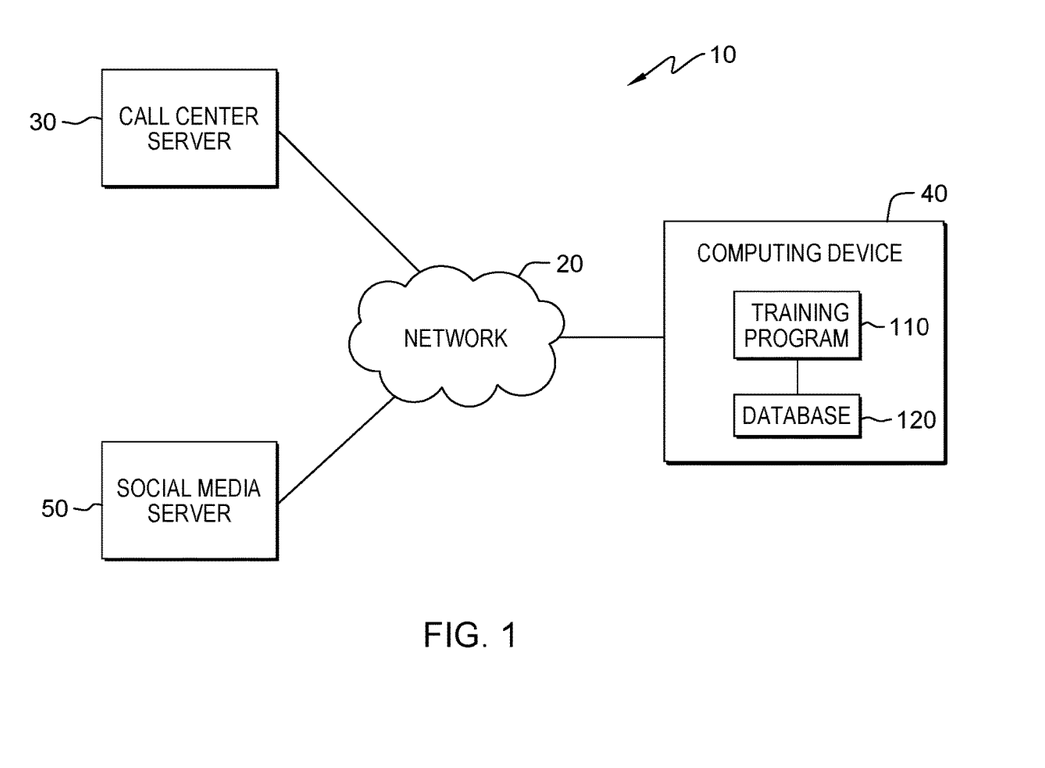
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes call center server 30, computing device 40, and social media server 50 interconnected over network 20. Network 20 may be a local area network (LAN), a wide area network (WAN) such as the Internet, a cellular data network, any combination thereof, or any combination of connections and protocols that will support communications between call center server 30, computing device 40, and social media server 50, in accordance with embodiments of the invention. Network 20 may include wired, wireless, or fiber optic connections. Computing system 10 may include additional computing devices, servers, or other devices not shown.

Call center server 30 may be a management server, a web server, or any other electronic device or computing system capable of processing program instructions and receiving and sending data. In some embodiments, call center server 30 may be a laptop computer, tablet computer, netbook computer, personal computer (PC), a desktop computer, or any programmable electronic device capable of communicating with call center server 30 and computing device 40 via network 20. In other embodiments, call center server 30 may represent a server computing system utilizing multiple computers as a server system, such as in a cloud computing environment. In another embodiment, call center server 30 represents a computing system utilizing clustered computers and components to act as a single pool of seamless resources. In one embodiment, call center server 30 contains information, such as, for example, previous conversations between customer service agents and customers. In other embodiments, call center server 30 hosts a call center/help desk website. In some embodiments, call center server 30 is a call center platform. In other embodiments, call center server 30 may include multiple components, as depicted and described in further detail with respect to FIG. 3.

Computing device 40 may be a personal device, desktop computer, laptop computer, netbook computer, tablet computer, management server, web server, or application server. In general, computing device 40 may be any electronic device or computing system capable of processing program instructions, sending and receiving data, and communicating with other devices over a network. In the depicted embodiment, computing device 40 contains training program 110 and database 120. In other embodiments, computing device 40 may include training program 110, database 12, and/or other components, as depicted and described in further detail with respect to FIG. 3.

Social media server 50 may be a management server, a web server, or any other electronic device or computing system capable of processing program instructions and receiving and sending data. In some embodiments, social media server 50 may be a laptop computer, tablet computer, netbook computer, personal computer (PC), a desktop computer, or any programmable electronic device capable of communicating with call center server 30 and computing device 40 via network 20. In other embodiments, social media sever 50 may represent a server computing system utilizing multiple computers as a server system, such as in a cloud computing environment. In another embodiment, social media sever 50 represents a computing system utilizing clustered computers and components to act as a single pool of seamless resources. In one embodiment, social media server 50 contains information, such as, for example, expressions of interest from various social media websites. In other embodiments, social media server 50 hosts a social networking website. In some embodiments, social media server 50 is a social media platform. In other embodiments, social media server 50 may include multiple components, as depicted and described in further detail with respect to FIG. 3.

Training program 110 trains customer service agents using persona-based chatbots. In doing so, training program 110 retrieves customer service interaction information. Training program 110 analyzes the customer service interaction information. Training program 110 interacts with the user. Training program 110 provides feedback to the user. In the depicted embodiment, training program 110 resides on computing device 40. In other embodiments, training program 110 may reside on another computing device or another server, provided that training program 110 can access call center sever 30, social media server 50, and database 120.

Database 120 may be a repository that may be written to and/or read by training program 110. In some embodiments, training program 110 may retrieve customer service interaction information and store the retrieved information to database 120. In other embodiments, database 120 may store information about the interaction with a user. In the depicted embodiment, database 120 resides on computing device 40. In other embodiments, database 120 may reside on another computing device or another server, provided that database 120 is accessible to training program 110.

Figure 2:
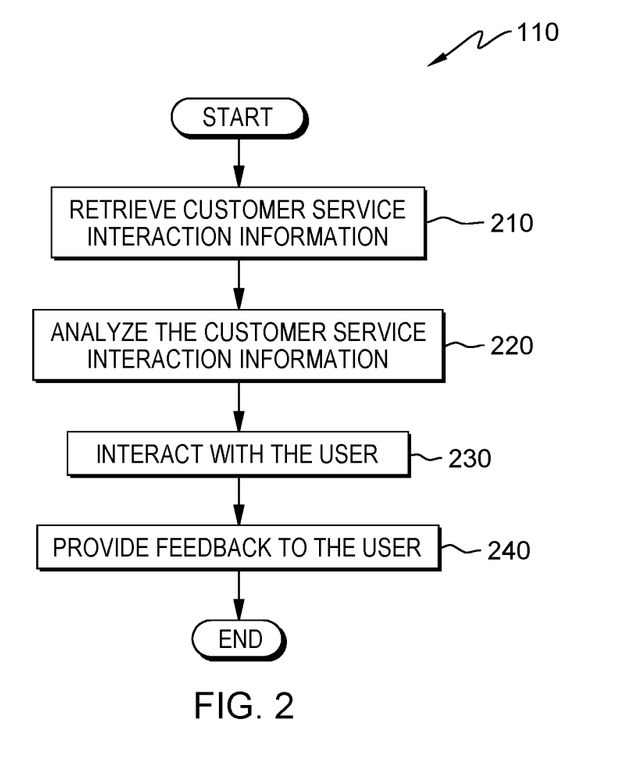
FIG. 2 depicts a flowchart of the steps of a training program, executing within the computing system of FIG. 1, for training customer service agents using persona-based chatbots.

FIG. 2 depicts a flowchart of the steps of a training program, executing within the computing system of FIG. 1, in accordance with an embodiment of the present invention. Training program 110 trains customer service agents using persona-based chatbots.

In step 210, training program 110 retrieves customer service interaction information. Customer service interaction information may include, but not limited to: conversations between customers and customer service agents and contextual information (e.g., customer identifying information, social media profiles, and demographics). In one embodiment, training program 110 retrieves customer service interaction information from call center server 30. In some embodiments, training program 110 retrieves customer service interaction information from social media server 50. In other embodiments, training program 110 retrieves customer service interaction information from database 120. In some embodiments, training program 110 uses natural language processing to receive the input information in a necessary form for use.

In step 220, training program 110 analyzes the customer service interaction information. In one embodiment, training program 110 preprocesses and aggregates the retrieved customer service interaction information. For example, a customer's request can be collected as text and audio files from different platforms. Training program 110 can format and merge the data.

In some embodiments, training program 110 analyzes the customer service interaction information to create a simulated natural learning environment for training customer service agents, which includes two subsystems: customer chatbots and feedback generation. The customer chatbot subsystem simulates different types of customers in different task scenarios. The feedback generation subsystem assesses customer service agents' performance during conversations and provide situational feedback, according to the customer service agents' performance and progress.

Training program 110 can combine the two subsystems as an integrated learning environment. Training program 110 builds up the types of customer chatbot styles in two ways: (1) a bottom-up taxonomy that can be derived from the retrieved/collected data. For example, unsupervised methods can be applied to extract tone and persona styles manifested in the retrieved/collected conversational data; and (2) a top-down taxonomy of styles can be defined by organizations and can learn the predefined styles in a supervised fashion with annotations.

The following is an embodiment of taxonomy, including five chatbot persona styles:

Meek Customer Chatbot: During a conversation with the customer service agent, the chatbot attempts to avoid confrontation and may not explicitly make their complaints known at the time. Customer service agents are trained to proactively initiate the conversation to solicit comments and complaints from the chatbot, and, then, do whatever is necessary to address the concerns from the chatbot.

Aggressive Customer Chatbot: During a conversation with the customer service agent, the chatbot attempts to complain loudly and at length. This chatbot is likely to not respond well to reasons or excuses why the product is unsatisfactory. Customer service agents should listen patiently and respectfully, agree with the chatbot, and carefully indicate when and how the problem can be resolved.

High-Roller Customer Chatbot: During a conversation with the customer service agent, the chatbot simulates customers who expect the high-end, absolute best products and are willing and able to pay for such. This chatbot is designed to complain in a reasonable manner and it is not interested in excuses.

Rip-Off Customer Chatbot: During a conversation with the customer service agent, the chatbot's mission is not to solve its complaint, but rather to gain certain things it is not entitled to have.

Chronic Complainer Customer Chatbot: During a conversation with the customer service agent, the chatbot simulates repeat customers who can never be satisfied. The goal of this chatbot is to complain.

In one embodiment, training program 110 uses statistical machine translation and deep learning techniques to simulate customers' requests and responses. The additional information, such as persona, task, and context can be considered in three possible ways. (1) Generate multiple responses (e.g., beam search) and select according to a target style, tone, or persona. (2) Design a separate method to modify generated responses. For example, a separate sequence-to-sequence model or a word-graph construction approach can be designed to modify the response. (3) Design new models to directly consider the persona, task, and context as additional constraints. For example, in a sequence-to-sequence model, word embedding can be trained to directly learn these constraints in response generation.

Training program 110, through the feedback generation subsystem, can assess customer service agents' training progress and provide situational feedback to help customer service agents better engage with a simulated/real customer. A first key module within the feedback generation is style assessment. Different organizations or brands may aim to train their customer service agents with certain styles to match their target brand image or personality. Training program 110 allows organizations to define target styles. To quantitatively measure these styles, training program 110 adopts crowdsourcing techniques to label a subset of the conversational data with a number of style attributes and adopt a supervised or semi-supervised method to assess styles represented in a conversation. In other embodiments, training program 110 can derive customer service agents' styles from the conversational data through an unsupervised method.

The following illustrates an embodiment of the style taxonomy:

Rational: Customer service agents are trained to listen and observe more than they talk. They aim to be very patient and offer specific/complete explanations to customers' questions.

Expressive: Customer service agents are looking for opportunities to socialize with customers. They aim to project a friendly and positive attitude and are trained to be enthusiastic when communicating with customers.

Inquisitive: Customer service agents attempt to be conservative and they prefer formality. They may carry on lengthy conversations, especially when attempting to get answers to questions. They are trained to heavily rely on practical information, such as times and dates to make their point.

Decisive: Customer service agents are trained to work proactively toward a solution to a problem. They aim to display a confident demeanor. They are trained to ask specific, direct questions and offer short, straight answers.

A second key module within the feedback generation is expertise assessment. Training program 110 evaluates a customer service agent's performance, ranging from utterance level to task level. In one embodiment, training program 110 applies a sequence-to-sequence model to automatically generate customer service agent responses to address customers' requests. Then, training program 110 computes the similarity between the responses generated by the model and the responses provided to the customer service agent through automatic metrics, such as BLEU scores. BLEU, bilingual evaluation understudy, is an algorithm for evaluating the quality of text which has been machine-translated from one natural language to another. In other embodiments, training program 110 manually rates the expertise level of customer service agents from their responses and adopts a supervised method to assess customer service agents' performance automatically.

A third key module within the feedback generation is situational feedback. Training program 110 provides feedback while considering customer service agents' styles and performance. For example, if training program 110 determines a customer service agent to be a low-level beginner, then training program 110 can provide multiple responses (e.g., generated by a sequence-to-sequence model) shown as a multiple-choice question. The customer service agent is asked to select one best response. Also, if training program 110 determines a customer service agent to be a middle-level beginner, then training program 110 can provide a response template. The customer service agent is trained to complete the template to respond to the request. Finally, if training program 110 determines a customer service agent to be a high-level trainee, then training program 110 may only provide hints, such as desired phrases and topics. The keywords can be extracted from the generated responses.

In one embodiment, training program 110, optimally, maps customer service agents' styles with customers' personas. For example, during the training process, training program 110 can store customer service agents' styles and performance on different types of customers and task scenarios to database 120. This data can be used as a basis to learn a transformation matrix M between agent style and customer persona: $P=A \times M \times C$. P represents the performance of multiple customer service agents. Each customer service agent's performance can be represented as a vector. A and C are customer service agents' styles and customers' personas, respectively. This mapping, M, can be used by training program 110 to consider the match between customer service agent styles and customer personas.

In step 230, training program 110 interacts with the user. The user can be a customer service agent, or trainee. In one embodiment, training program 110 interacts with the customer service agent through audio. In some embodiments, training program 110 interacts with the customer service agent through text. In other embodiments, training program 110 interacts with the customer service agent, using the analyzed input data through the customer chatbots and feedback generation. The customer chatbots may use information from the feedback generation from previous conversations that were retrieved by training program 110.

In step 240, training program 110 provides feedback to the user. In one embodiment, training program 110 provides feedback to the customer service agent using the feedback generation described above. In other embodiments, training program 110 provides feedback to the organization using the feedback generation described above. Training program 110 assesses the current customer service agent's style and expertise and provides feedback based on the situation at hand. In some embodiments, training program 110 stores this feedback to database 120 for future use with other customer service agents who may have to go through a similar training process.

Figure 3:
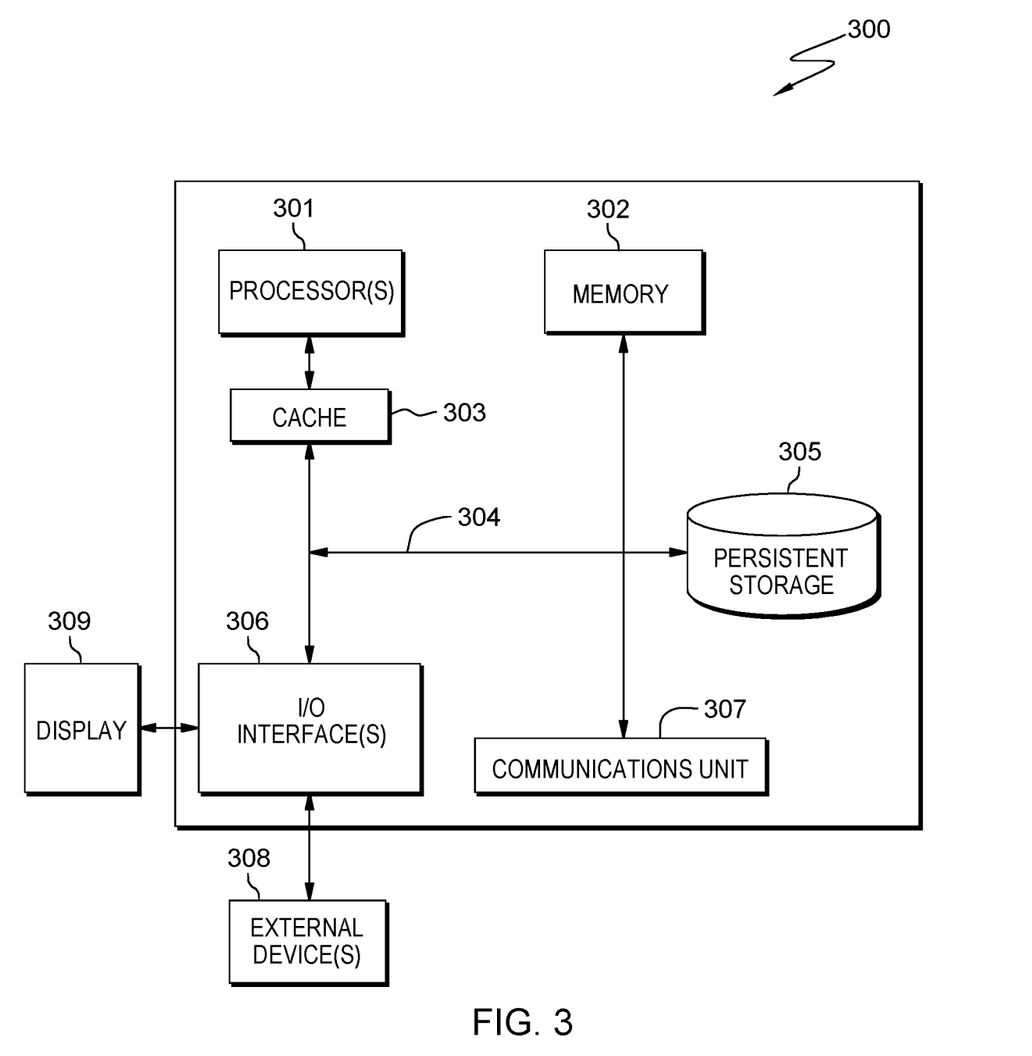
FIG. 3 depicts a block diagram of components of the server and/or the computing devices of FIG. 1, in accordance with an embodiment of the present invention.

FIG. 3 depicts computer system 300, which is an example of a system that includes components of server 30 and/or computing device 40. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307. Training program 110 and database 120 may be downloaded to persistent storage 305 of computing device 40 through communications unit 307 of computing device 40.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., training program 110 and database 120, can be stored on such portable computer readable storage media and can be loaded onto persistent storage 305 of computing device 40 via I/O interface(s) 306 of computing device 40. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
analyzing, by one or more processors, using natural language processing, customer service interaction information retrieved from at least two distinct platforms, wherein the at least two distinct platforms include a call center and a social media server, and wherein the analyzing includes preprocessing and aggregating the retrieved customer service interaction information;
generating, by one or more processors, a plurality of responses according to a target style, a tone, and a persona;
updating, by one or more processors, a model to directly consider a style assessment and an expertise assessment of a user as additional constraints, wherein the model utilizes word embedding to learn the additional constraints;
mapping, by one or more computer processors, based, at least in part, on the model, a plurality of styles of the user to a plurality of task scenarios and a plurality of customer personas to generate a transformation matrix for optimizing performance in subsequent customer service interactions; and
creating, by one or more processors, a simulated environment for providing situational customer service feedback, wherein the simulated environment includes the call center server, the social media server, a computing device, an interactive customer chatbot subsystem and an interactive feedback generation subsystem interconnected over a network, wherein the interactive customer chatbot subsystem simulates a type of customer persona in a task scenario utilizing a bottom-up taxonomy derived from extracted tone and persona styles manifested in collected conversational data, wherein the interactive feedback generation subsystem receives user performance as an input when the user interacts with the chatbot subsystem, and wherein the interactive feedback generation subsystem outputs situational feedback to the user based on the task scenario and user progress relative to the type of customer persona in the task scenario.

2. The method of claim 1, further comprising:
extracting, by one or more processors, dynamically, a tone and a persona manifested in the retrieved customer service interaction information to build up a type of customer chatbot style.

3. The method of claim 1, further comprising:
simulating, by one or more processors, a customer's requests and responses, using statistical machine translation and deep learning; and
modifying, by one or more processors, the plurality of responses, using a sequence-to-sequence model and a word graph.

4. The method of claim 1, further comprising:
evaluating, by one or more processors, the user's performance;
applying, by one or more processors, a sequence-to-sequence model to automatically generate responses of the user to address a customer's request; and
computing, by one or more processors, a similarity between the responses generated by the model and responses provided to the user through automatic metrics.

5. The method of claim 1, wherein the customer service interaction information includes conversations between a customer and the user, customer identifying information, social media profiles, and demographic contextual information.

6. A computer program product comprising:

One or more computer readable storage media and program instructions stored on the one or more computer readable storage media, the stored program instructions comprising:

program instructions to analyze, using natural language processing, customer service interaction information retrieved from at least two distinct platforms, wherein the at least two distinct platforms include a call center and a social media server, and wherein the analyzing includes preprocessing and aggregating the retrieved customer service interaction information;

program instructions to generate a plurality of responses according to a target style, a tone, and a persona;

program instructions to update a model to directly consider a style assessment and an expertise assessment of the user as additional constraints, wherein the model utilizes word embedding to learn the additional constraints;

program instructions to map based, at least in part, on the model, a plurality of styles of the user to a plurality of task scenarios and a plurality of customer personas to generate a transformation matrix for optimizing performance in subsequent customer service interactions; and program instructions to create a simulated environment for providing situational customer service feedback, wherein the simulated environment includes the call center server, the social media server, a computing device, an interactive customer chatbot subsystem and an interactive feedback generation subsystem interconnected over a network, wherein the interactive customer chatbot subsystem simulates a type of customer persona in a task scenario utilizing a bottom-up taxonomy derived from extracted tone and persona styles manifested in collected conversational data, wherein the interactive feedback generation subsystem receives user performance as an input when the user interacts with the chatbot subsystem, and wherein the interactive feedback generation subsystem outputs situational feedback to the user based on the task scenario and user progress relative to the type of customer persona in the task scenario.

7. The computer program product of claim 6, the stored program instructions further comprising:

program instructions, stored on the one or more computer readable storage media, to extract, dynamically, a tone and a persona manifested in the retrieved customer service interaction information to build up a type of customer chatbot style.

8. The computer program product of claim 6, the stored program instructions further comprising:

program instructions, stored on the one or more computer readable storage media, to simulate a customer's requests and responses, using statistical machine translation and deep learning; and program instructions, stored on the one or more computer readable storage media, to modify the plurality of responses, using a sequence-to-sequence model and a word graph.

9. The computer program product of claim 6, the stored program instructions further comprising:

program instructions, stored on the one or more computer readable storage media, to evaluate the user's performance;

program instructions, stored on the one or more computer readable storage media, to apply a sequence-to-sequence model to automatically generate responses of the user to address a customer's request; and program instructions, stored on the one or more computer readable storage media, to compute a similarity between the responses generated by the model and responses provided to the user through automatic metrics.

10. The computer program product of claim 6, wherein the customer service interaction information includes conversations between a customer and the user, customer identifying information, social media profiles, and demographic contextual information.

11. A computer system comprising:

One or more computer processors, one or more computer readable storage media, and program instructions stored on the one or more computer readable storage media for execution by at least one of the one or more computer processors, the stored program instructions comprising:

program instructions to analyze, using natural language processing, customer service interaction information retrieved from at least two distinct platforms, wherein the at least two distinct platforms include a call center and a social media server, and wherein the analyzing includes preprocessing and aggregating the retrieved customer service interaction information;

program instructions to generate a plurality of responses according to a target style, a tone, and a persona;

program instructions to update a model to directly consider a style assessment and an expertise assessment of the user as additional constraints, wherein the model utilizes word embedding to learn the additional constraints;

program instructions to map based, at least in part, on the model, a plurality of styles of the user to a plurality of task scenarios and a plurality of customer personas to generate a transformation matrix for optimizing performance in subsequent customer service interactions; and program instructions to create a simulated environment for providing situational customer service feedback, wherein the simulated environment includes the call center server, the social media server, a computing device, an interactive customer chatbot subsystem and an interactive feedback generation subsystem interconnected over a network, wherein the interactive customer chatbot subsystem simulates a type of customer persona in a task scenario utilizing a bottom-up taxonomy derived from extracted tone and persona styles manifested in collected conversational data, wherein the interactive feedback generation subsystem receives user performance as an input when the user interacts with the chatbot subsystem, and wherein the interactive feedback generation subsystem outputs situational feedback to the user based on the task scenario and user progress relative to the type of customer persona in the task scenario.

12. The computer system of claim 11, further comprising:

program instructions, stored on the one or more computer readable storage media for execution by at least one of the one or more computer processors, to extract, dynamically, a tone and a persona manifested in the retrieved customer service interaction information to build up a type of customer chatbot style.

13. The computer system of claim 11, further comprising:
program instructions, stored on the one or more computer readable storage media for execution by at least one of the one or more computer processors, to simulate a customer's requests and responses, using statistical machine translation and deep learning; and
program instructions, stored on the one or more computer readable storage media for execution by at least one of the one or more computer processors, to modify the plurality of responses, using a sequence-to-sequence model and a word graph.

14. The computer system of claim 11, further comprising:
program instructions, stored on the one or more computer readable storage media for execution by at least one of the one or more computer processors, to evaluate the user's performance;
program instructions, stored on the one or more computer readable storage media for execution by at least one of the one or more computer processors, to apply a sequence-to-sequence model to automatically generate responses of the user to address a customer's request; and
program instructions, stored on the one or more computer readable storage media for execution by at least one of the one or more computer processors, to compute a similarity between the responses generated by the model and responses provided to the user through automatic metrics.

* * * * *